(12) United States Patent  (10) Patent No.: US 8,847,584 B2
Steinich et al.  (45) Date of Patent: Sep. 30, 2014

(54) ASSEMBLY FOR DETECTING MORE THAN ONE ROTATION THROUGH A POSITION ENCODER MAGNET

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 501 days.

(21) Appl. No.: 12/806,365

(22) Filed: Aug. 11, 2010

(65) Prior Publication Data

US 2011/0080162 A1   Apr. 7, 2011

(30) Foreign Application Priority Data

Oct. 6, 2009   (DE) .................. 10 2009 048 389

(51) Int. Cl.
*G01B 7/30* (2006.01)
*G01D 5/245* (2006.01)
*G01D 5/04* (2006.01)
*G01D 5/14* (2006.01)
*B62D 15/02* (2006.01)

(52) U.S. Cl.
CPC ............... *G01B 7/30* (2013.01); *G01D 5/2452* (2013.01); *G01D 5/04* (2013.01); *G01D 5/145* (2013.01); *B62D 15/0215* (2013.01)
USPC .............. 324/207.25; 324/207.2; 324/207.21; 702/151

(58) Field of Classification Search
CPC ... G01D 5/2452; G01D 5/04; H01H 2300/02; F16H 59/105
USPC .................................... 324/207.25
See application file for complete search history.

(56) References Cited

U.S. PATENT DOCUMENTS

| | | | | |
|---|---|---|---|---|
| 6,324,905 B2 * | 12/2001 | Noltemeyer et al. | ........ | 73/865.9 |
| 7,042,211 B2 | 5/2006 | Kabashima et al. | | |
| 7,292,028 B2 * | 11/2007 | Hahn | ........ | 324/207.25 |
| 7,353,608 B2 * | 4/2008 | Yazdani | ........ | 33/1 PT |
| 2005/0258824 A1 * | 11/2005 | Uehira et al. | ........ | 324/207.25 |
| 2007/0001668 A1 * | 1/2007 | Mock et al. | ........ | 324/207.22 |
| 2007/0152662 A1 * | 7/2007 | Ushihara et al. | ........ | 324/207.25 |
| 2008/0005913 A1 * | 1/2008 | Kachouh | ........ | 33/1 PT |
| 2008/0136404 A1 * | 6/2008 | Gauthier et al. | ........ | 324/207.2 |
| 2008/0164866 A1 * | 7/2008 | Steinich et al. | ........ | 324/207.2 |
| 2008/0164867 A1 * | 7/2008 | Steinich et al. | ........ | 324/207.2 |

FOREIGN PATENT DOCUMENTS

| | | |
|---|---|---|
| DE | 19958504 | 7/2001 |
| DE | 102006048501 | 4/2008 |
| DE | 102008059775 | 4/2009 |

* cited by examiner

*Primary Examiner* — Melissa Koval
*Assistant Examiner* — Stephen G Armstrong
(74) *Attorney, Agent, or Firm* — Head, Johnson & Kachigian, P.C.

(57) ABSTRACT

The rotational position of an encoder magnet can be scanned over more than 360° by respective sensor elements in that magnets are disposed on different stages of a suitable transmission, in particular of a differential transmission, and the magnets are scanned by separate sensor elements, whose signals are computed with one another and yield a total number of revolutions.
In particular, when an assembly of this type shall be built very small, undesirable magnetic interferences for the sensor elements have to be avoided through flux conductor elements since the interferences distort the measurement results. Thus, a differentiation is made between active and passive flux conductor elements.

16 Claims, 18 Drawing Sheets

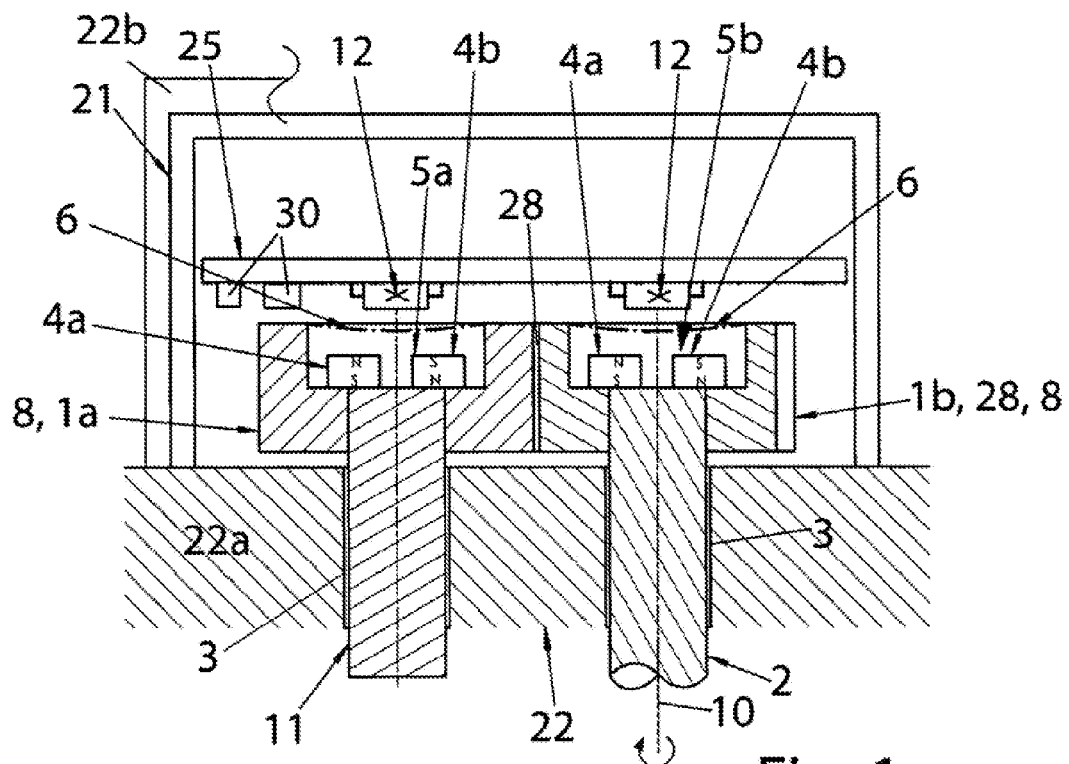
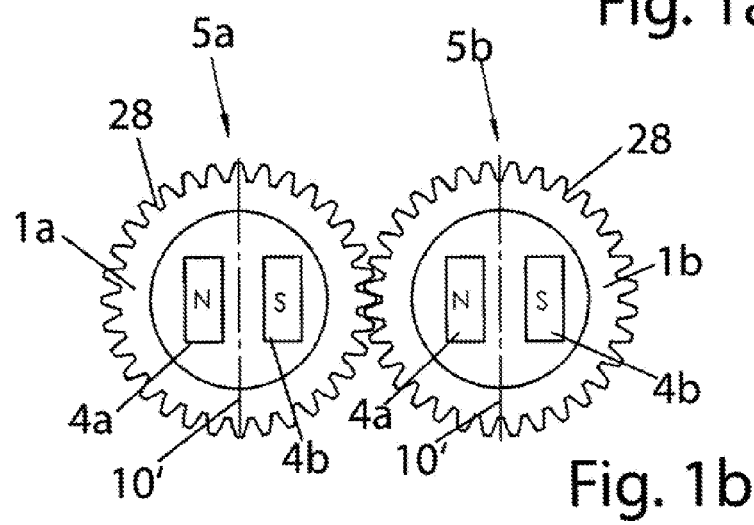

ASSEMBLY FOR DETECTING MORE THAN ONE ROTATION THROUGH A POSITION ENCODER MAGNET

I. FIELD OF THE INVENTION

The invention relates to a sensor assembly for measuring rotations with more than one full revolution.

II. BACKGROUND OF THE INVENTION

In order to indicate a rotation of a body, subsequently generally designated as shaft without limiting the invention thereto, it suffices in the simplest case to use an indicator disposed torque proof at a shaft, wherein the indicator indicates the rotational position.

As soon as the shaft rotates by more than one full revolution, the total amount of rotation cannot be read from such a simple indicator anymore.

An indicator of this type can be mechanically coupled with the shaft, but it can also be coupled touch free, e.g. magnetically coupled.

A typical known solution is disposing a permanent magnet eccentrically on the shaft and detecting its rotational position touch free through a magnetic field sensitive sensor, in particular a multi-Hall assembly.

This multi-Hall assembly, which is typically configured as a chip, measures the position of a magnetic field, thus of the field lines as a vector in its measuring plane, typically in the chip plane.

This has the advantage that the absolute field strength and also the direction of the magnetic field transversal to the measuring plane hardly influence the measuring result.

In order to indicate rotations over more than one revolution (so-called multi-turn), there are several options.

Between a shaft and an indicator, there is a transmission ratio that is large enough, so that the maximum number of revolutions can be indicated with a single indicator.

This assembly certainly has the disadvantage that small rotation angle changes of the shaft are reflected by the indicator only in a comparatively imprecise manner.

There is also the option to couple the shaft with two indicators, e.g. to couple the two indicators with different stages of a step-down transmission disposed there between.

Then, however, the first indicator can essentially only represent the completed revolutions performed, wherein the second indicator represents the fractions of a revolution.

On the one hand side, an increasing number of transmission stages is required for an increasing number of revolutions and the mechanical complexity is increased.

Since typically instead of a simple indicator hand, an angle sensor element is required, which supplies an electrical signal, e.g. the magnetic field sensitive angle sensor element described supra, a configuration of this type furthermore has the disadvantage that the angle sensor elements used for the different transmission stages must have different configurations and cannot be identical components as described e.g. in EP 10 76 809.

Another option is to select the transmission ratio of the at least one transmission stage of the step-down transmission rather low, e.g. when using a gear transmission to select it as N:N+/−1, where N is the number of teeth on the interacting gears.

Then, however, the angle sensor element of the shaft which is not stepped down indicates the rotational position within a complete revolution; however, the angle sensor element of the next stepped down transmission stage indicates a rotational position, which deviates from the number of completed revolutions.

However, it is known from DE 10 2005 035 107 and also from DE 198 21 467 A1, how the number of complete revolutions can be computed from a super position of the two cyclically repeating signals of the two sensor elements through respective processing electronics, wherein the signals, however, differ through a respective transmission ratio with respect to their cycle lengths.

With this solution principle, however, in particular where it shall preferably operate for the recited reasons touch free through magnetic field sensitive sensors, however, numerous problems occur which cannot be solved with the prior art solutions recited supra.

On the one hand side, the goal for an angle sensor like for any sensor is to build the sensor as small as possible, since it shall occupy the least installation space possible in a surrounding application.

Since the magnets disposed on the particular transmission stages, in principle, however, can also influence the sensor associated with the respective other magnet, when the magnets are moved closer and closer to one another, this limit condition would rather indicate a rather large offset of the two magnet assembly in radial or in axial direction.

In case the magnet assemblies and transmission stages shall be very small with a small distance in between, in practical applications with a distance below 1 cm, in order to save installation space, the magnetic field generated by the magnet assembly has to be influenced in a controlled manner, wherein a differentiation has to be made between the useful field to be measured by the angle sensor element of the sensor and the scatter field which is insignificant for the measurement.

For a magnet assembly, which is configured not only from one magnet, but from two magnets, disposed opposite to one another with respect to the rotation axis, e.g. with their pole axis parallel to the rotation axis with opposite pole directions, the useful field is the one half of the annular inner portion of the magnetic field, while the scatter field is formed by the two respective field line circles disposed on the outsides of the magnet and the rest of the inner magnet field ring.

In this context, the shielding of the magnetic field sensitive sensor and/or of the magnet assembly on the backside through simple magnetically insulating shielding plates made from a magnetizable material is already known. Such simple shielding plates, however, also deflect the useful field in an undesirable manner, and thus degrade the measuring precision of a sensor of this type.

III. DESCRIPTION OF THE INVENTION a) Technical Objective

Thus, it is the object of the invention to provide an angle sensor assembly of this type which has the lowest possible installation height, in spite of a simple configuration and still has high measurement precision.

b) Solution

The object is accomplished through the features of claim 1. Advantageous embodiments can be derived from the dependent claims.

Initially, a differentiation is made for the flux conductor elements for the magnetic flux, and in particular regarding the direction, thus the vector of the magnetic flux between active and passive flux conductor elements.

Active flux conductor elements are interpreted as a configuration and arrangement of the at least one magnet at the magnet unit which actively configures the magnetic flux exiting from the magnet, thus the usable field, so that it reaches and permeates the angle sensor element in an optimally processable form.

A passive flux conductor element is interpreted in particular as the spatially limited influencing of a residual magnet field, which is not used as a usable field, thus of the scatter field, through additional elements, in particular made from materials with suitable remanence, like e.g. soft iron.

A passive flux conductor element of this type has to co-rotate with the magnet assembly in order to prevent measurement errors caused by remanence.

A passive flux conductor element of this type envelops the magnet unit e.g. radially, in particular in a closed annular manner, and preferably without contacting the magnet unit and in particular the magnets, thus at a distance. An edge flux conductor element of this type is configured in particular as flux conductor ring.

Instead or in a supplemental manner thereto, the backside of the flux conductor element facing away from the angle sensor element can be configured as a base, and can in particular be configured plate shaped as a flux conductor plate. Thus, the particular portions of a flux conductor element of this type, which can also be integrally configured as a pot shaped flux conductor element, serve different functional purposes.

The base covering the backside of the magnet unit functions as a back iron element in order to close the portion of the inner field line circuit facing away from the angle sensor element from one magnet to the other magnet on the shortest path to a back iron. Therefore, the magnets preferably sit directly on this portion of the flux conductor element in a contacting manner. Wall thickness, geometry and permeability in this portion are selected, so that a magnetic flux, which is as concentrated as possible, only occurs within the back iron element and not outside thereof, and thus preferably also no magnetic saturation of the flux conductor element occurs.

The outer circumferential edge, on the other hand, acts as a flux limiter element against inner and outer magnetic fields, which envelops the magnets and preferably protrudes beyond them. The wall thickness geometry and material properties, in particular permeability of the edge side flux conductor element, are selected, so that the scatter flux of the magnet unit permeating the ambient outside of the flux limiter element is minimized, and the scatter flux runs completely within the flux limiter element in an optimum manner, and is diverted by the flux conductor element and thus limited.

Another passive flux conductor element can preferably be disposed as a flat plate shaped element, and with very small material thickness parallel to the also typically flat angle sensor unit, in particular at its backside facing away from the magnet unit. In a preferred embodiment, the plate shaped flux conductor element is in the same plane as the angle sensor element, which is e.g. possible for a hall-array by mounting the plate shaped flux conductor element between the particular hall sensors of the hall-array, which are e.g. disposed in a square.

For a passive flux conductor element, preferably a material with a remanence $\mu$ of 50 to 1,000, in particular 100 to 800, is selected, e.g. a soft iron material, when the flux conductor element is integrally produced, e.g. with an outer teething. When configured as a separate component, however, the flux conductor element should have $\mu > 1,000$; better $>5,000$.

In order to form active flux conductor elements, the magnets, on the one hand side, can be disposed in a specific manner, and their field exit surfaces towards the angle sensor element can be configured in a specific manner.

In a preferred embodiment, the magnet unit includes two magnets placed opposite to one another and symmetrical to the rotation axis with a pole axis respectively parallel to a rotation axis of the magnet unit, wherein the pole direction of the one magnet is oriented opposite to the pole direction of the other magnet. In this embodiment, the angle sensor element is disposed preferably axially slightly offset from the magnets and in radial direction exactly there between, thus on the rotation axis. The pole surfaces of the magnets oriented towards the sensor element are thus preferably sloped downward from the outer edge towards the rotation axis in order to conduct the largest portion possible of the magnetic field lines to the measuring portion of the sensor element, wherein the field lines exit from the pole surface.

In another embodiment, the magnet unit includes two magnets which are in turn disposed eccentric and symmetrically opposed to one another relative to the rotation axis of the magnet unit, but have an identical pole direction, which in this case is disposed in particular perpendicular to the rotation axis and intersects the rotation axis. In this case, the angle sensor element is disposed in particular in the intermediary space between the two magnets, since the field lines of the usable field do not curve out in arcs between the pole surfaces, but rather extend straight there between from one magnet to the other. In this context, in particular, a concave curvature of the pole surfaces can cause a bundled exit in a direction towards the measuring portion of the angle sensor element.

The rotational connection of the at least two magnet units can be provided in a conventional mechanical manner, e.g. through teethings which are applied as external teethings directly to the magnet units or to a separate component, acting as a gear, to which the magnet units are connected in a torque proof manner. Also other mechanical connection through friction locking, tooth belts or similar can be used.

Besides that, there are also contactless rotatable couplings, e.g. through magnetizations which alternate along the circumference, which facilitates implementing a mechanical transmission.

The mechanically simplest configuration is disposing an external teething directly on the outside of the e.g. pot shaped flux conductor element. However, then the existing mechanical properties of the material of the flux conductor element have to suffice as predetermined parameters, which can e.g. make the required highly precise fabrication of the gears, which can typically only be performed through milling or grinding, more difficult.

It is another option to fabricate the teething on a separate gear, which is not used as a flux conductor element, which can then be made from any material, e.g. fracture resistant steel or also plastic material, and to dispose the magnet unit and also the respective portions of the flux conductor element on the face of the gear or in a pot shaped recess of the gear. Thus, the flux conductor element can be configured in any manner and can include e.g. only an edge portion or also the base shaped portion or both together, and can be configured as an integral or also multi-component, e.g. pot shaped flux conductor element.

In particular for an integral configuration of teething and flux conductor element, using a plastic material is also possible, which includes embedded magnetic particles, and thus in particular, the distribution of the magnetic particles within the plastic material is not uniform over the flux conductor element, but is controlled according to the respective functional principle, and in particular, in the portion of the teething, no magnetic particles are embedded at all if possible.

Thus, the two rotational units, thus the teethings, preferably directly mesh with one another, in particular in the view of the fact that the entire angle sensor shall have very small exterior dimensions, e.g. of less than 2 cm in diameter, and also with respect to its axial length, in order to be usable as universally as possible, and also in order to be able to assume the function of current multi-turn potentiometers, which also have these maximum dimensions.

In order to avoid an undesired mutual influencing of the magnet unit upon the other non-associated angle sensor element, one would certainly like to increase the distance between the two units, thus the distance of the rotation axis, which is possible mechanically in a simple manner by disposing a center gear there between. This, however, increases the size of the configuration of the sensor.

With respect to the transmission portion of the angle sensor, the speed ratio of the meshing gears is selected as small as possible, thus as close as possible to 1, but still different from 1. This is achieved in practical applications in that the number of teeth in two meshing gears only differs by one tooth. For such a "differential transmission", a number of revolutions according to the first number of teeth of the first gear are necessary until the initial state is achieved again for the entire transmission.

This number of revolutions, which are necessary to achieve again exactly the same initial state with respect to the entire transmission, represents the measuring range of the angle sensor. When this range is required very large, then it can be necessary to use plural transmission stages, thus more than only two interacting magnet units with angle sensor elements and thus also more than two gears.

E.g. when plural gears, which are distributed along a circumference, e.g. four gears, which are respectively configured with magnet units and with associated angle sensor elements, interact about a central gear with a magnet unit, which is externally driven, then a measuring range of a very high number of total revolutions of the transmission can thus also be achieved for a relatively small number of teeth of the particular transmission. Also, then the number of teeth of the particular gears will differ as little as possible. If possible, they will only differ by one tooth.

Accordingly, either a rotation symmetrical housing can be selected as a housing for the angle sensor, wherein the driving from the outside is preferably performed onto a gear centrally disposed in the housing and onto its magnet unit.

In case the angle sensor only includes two magnet units, they can also be disposed in a non-centric, e.g. circular segment shaped oval or slotted hole shaped housing in which the drive is then disposed centrically at one end of the housing.

Based on the small dimensions, also a support of the rotatable components, which has the lowest friction possible, and still is mechanically not very complex, is very important, wherein the components are driven, thus a shaft or shaft stub, which reach through the housing to the outside, wherein the components support the magnet units which are not directly driven from the outside or the components support the gears of the magnet units in the housing.

According to the invention, it is proposed to provide this support through a Ferro fluidic straight bearing instead of using a typical rolling element bearing.

Thus, a liquid, the Ferro fluid is used as a sliding layer between the components moved relative to one another, wherein very small magnetizable particles swim or float within the Ferro fluid. Since one of the components to be supported relative to one another is configured magnetic, the magnetizable particles of the Ferro fluid attach to the surface of the magnet, and thus preferably at locations where the magnet lines exit from these magnets in a particular concentrated manner, thus corners or edges.

This way, e.g. the shaft extension disposed torque proof at a gear can be configured as a magnet, which is supported in a housing through a Ferro fluid. Then as an axial support, a metal component with the smallest possible contact surface is disposed in the dead hole of the support in which the shaft extension is located, wherein the contact surface is axially oriented, e.g. a metal ball with a diameter of a dead hole is pressed into the base of the dead hole, and thus is retained at this location and serves as an axial barrier, e.g. for a housing made from plastic material. A Ferro-fluidic support of this type furthermore has the advantage that thus also liftoff, this means undesirable outward movement of the shaft extension from the dead hole is prevented, since it is magnetically attached to base side metal component.

Another option is to press a magnetic shaft extension torque proof into a dead hole of the housing, and to let it axially protrude from the housing, and to support the magnet unit or its gear on such an axle extension in turn through a Ferro-fluidic support.

Furthermore, different assemblies of magnet units and angle sensor elements with different advantages and disadvantages are feasible.

In a mechanically simple configuration, the magnet units and/or their gears are placed next to one another in the same plane and the angle sensor elements are disposed opposite to them also in a common plane. This facilitates e.g. housing the magnet units and the gears in a first housing half which is e.g. configured pot shaped, and disposing the angle sensor elements and possibly the associated processing electronics, which can be disposed on a separate circuit board, or also within the respective angle sensor element configured as a chip in a cover, in a cover, in particular in a pot shaped cover as a second housing half of the housing.

Another embodiment includes disposing the two angle sensor elements directly opposite to one another on sides of the same circuit board which are oriented away from one another, so that also then the two magnet units are disposed opposite to one another on a common axis of rotation. Then, however, a third gear as an intermediary gear is necessary between the two gears supporting the magnet units.

Another solution includes disposing the magnet units and/or their gears on the same plane, but with opposite sides not covered by the flux conductor elements. The associated angle sensor elements are then disposed on opposite planes with respect to the plane of the magnet elements.

This is a solution in which undesirable mutual influencing of the magnet units and of the angle sensor elements is minimized, which, however, also increases the mechanical complexity for the housing.

This complexity can only be minimized when two identical half shells are thus used as a housing, wherein a magnet unit is disposed in each half shell, and the respective angle sensor element for the other respective magnet is disposed next to the magnet unit.

The employed sensor elements preferably have a resolution with identical fineness and also an identical measuring precision and are in particular configured identical.

For all described solutions, the signals supplied by the at least two angle sensor elements have to be computed with one another, in order to compute the exact number of complete revolutions of the drive shaft, while the exact rotational position within 360° is directly indicated by the angle sensor element of the magnet unit driven from the outside. These processing electronics are either disposed separately on the circuit board adjacent to the sensor elements or they can be included with increasing integration in the microchip, wherein the angle sensor element is typically configured as a microchip anyhow.

However, when contrary to the preceding embodiments, the at least two magnet units are coupled with one another through a large transmission ratio, which significantly differs from 1.0, e.g. in that one of the two gears is a one-tooth gear, the other one, however, has many teeth, then it is more useful to scan only the magnet units of the gear with the lower number of teeth with a high resolution angle sensor element, while an angle sensor element with much lower resolution suffices for the other magnet unit.

All types of XMR-elements can be used as angle sensor elements, e.g. an AMR-element, or also a HALL-array, wherein the latter is then preferably comprised of four or more particular HALL-elements.

c) Embodiments

Embodiments of the invention are subsequently described in more detail with reference to drawing figures, wherein.

Figure 1C:
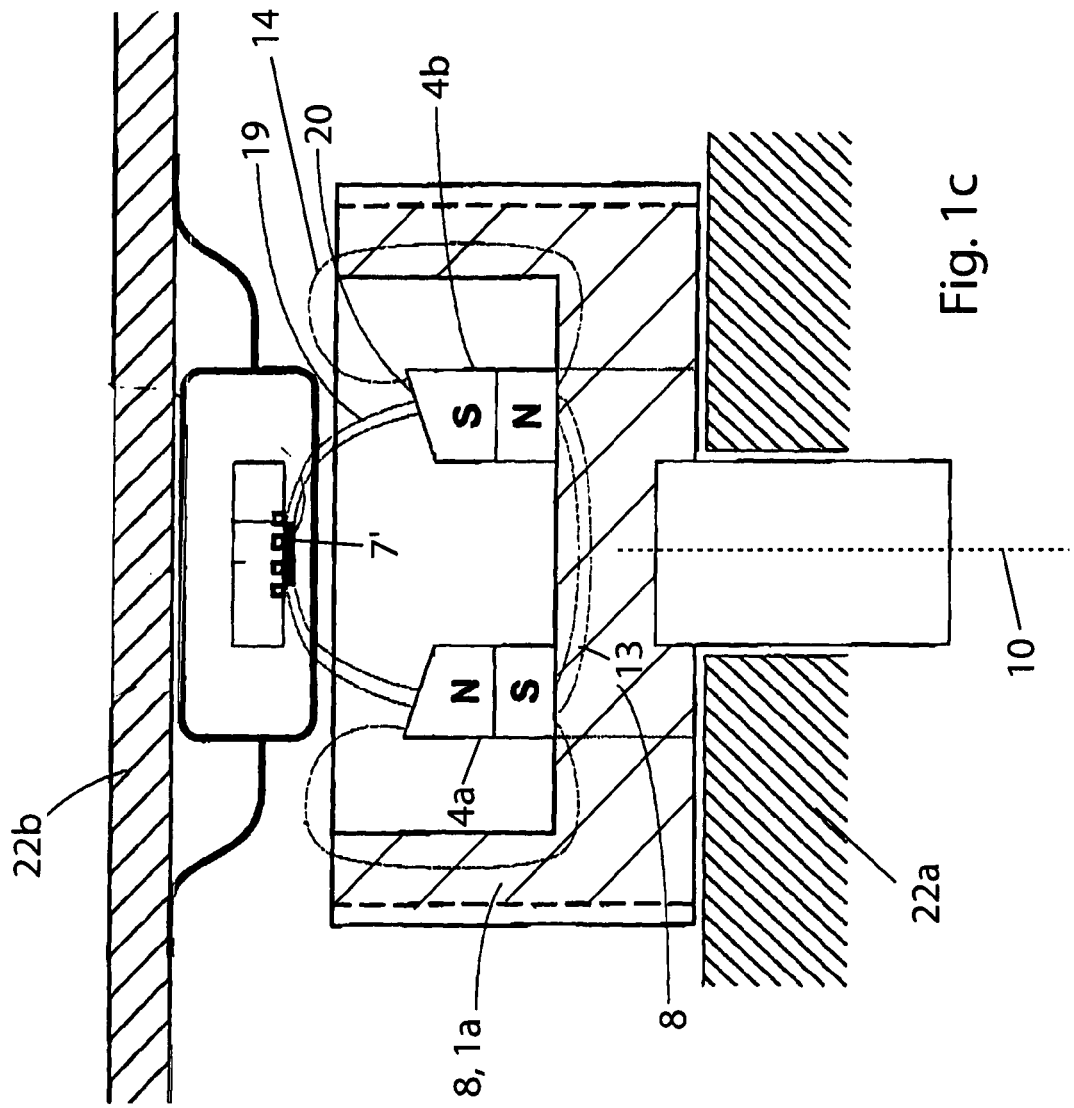
FIG. 1 illustrates a first embodiment of an angle sensor according to the invention in an overall view.

The angle sensor according to the invention is illustrated in FIG. 1a in a longitudinal sectional view and in FIG. 1b in top view, in which only the two magnet units 5a, b are illustrated.

Thus, it is apparent that the two gears 1a, b, which are disposed on one, shaft each, mesh with one another, wherein the shaft 2 of the first gear 1b passes through the lower housing component 22a and is driven rotation about the rotation axis 10 from the outside, whereas the second gear 1a is only placed in the housing component 22a through a shaft extension 11 and is rotatably supported therein.

Thus, the gear 1b has 32 teeth and the gear 1a has 31 teeth, so that only after 32 revolutions of the shaft 2, the same starting situation is reached again, and all situations there between differ with respect to an angular position of the shaft 2 and/or of the shaft extension 3, thus of the magnet units 5a, b.

The rotational positions of the shaft 2 and of the shaft extension 3 are detected by disposing a magnet unit 5a or 5b torque proof on each of the gears 1a, b, which are made from two respective magnets 4a, b, which are block shaped, in particular cuboid in the embodiment in FIG. 1a, wherein the magnets are disposed symmetrically opposed to one another relative to the rotation axis 10, 10', and parallel thereto with their pole axes, but opposite to one another with respect to the two magnets 4a, b.

The magnets 4a, b are thus disposed in a pot shaped recess in the face of the respective gear 1a, b, wherein the face is oriented towards an angle sensor element 12, so that they are attached to the base of the pot and in particular the interior of the pot is encased with encasement compound 6.

At the lowest possible distance from the magnet units 5a, b, in this case still outside of the pot shaped recess in the gear 1a, b, a respective angle sensor element 12 is disposed on each rotation axis 10, 10', wherein the angle sensor element is capable of measuring the magnetic field generated by the associated magnet unit, e.g. 5a, in particular with respect to the direction of the magnetic field lines, thus of the magnet vector, in the portion of the angle sensor element 12. The angle sensor elements 12 are thus disposed as a flat chip on the front side of a circuit board 25.

Furthermore, a pot shaped shielding cover 21 made from ferromagnetic material is disposed in the upper housing component 22b in FIG. 1a, wherein the shielding cover is stationary like the upper housing component 22b, thus does not rotate with the magnet units 5a, b and shields all angle sensors 12 together from the backside and from the circumferential surfaces against external magnetic interference fields.

Figure 2A:
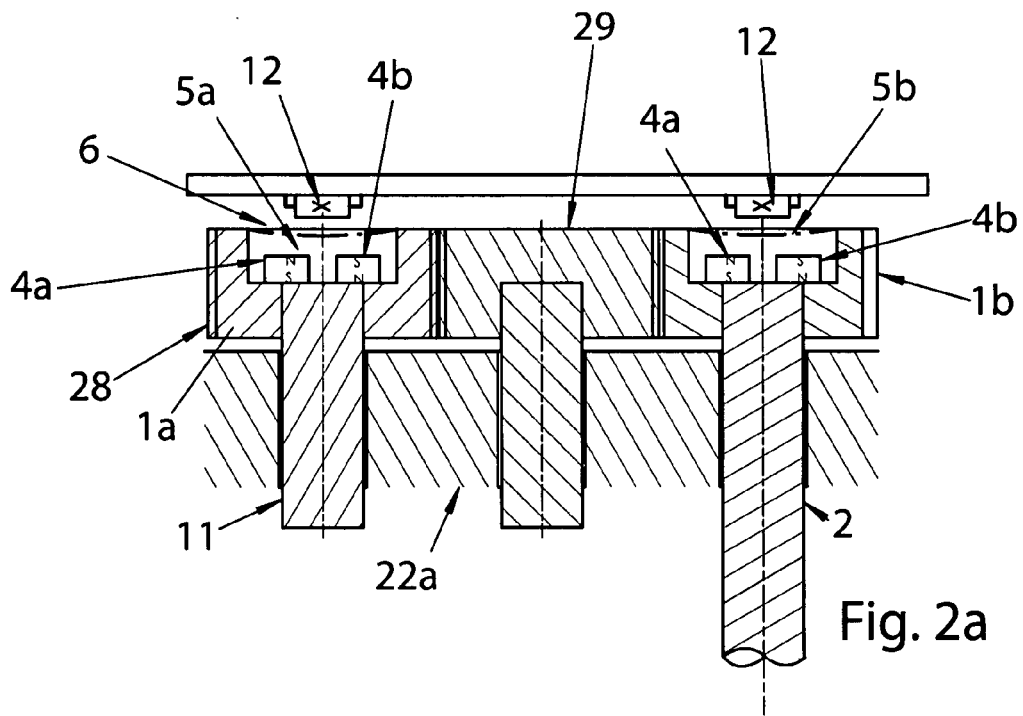
FIG. 2 illustrates an embodiment with a center gear.
Figure 2B:
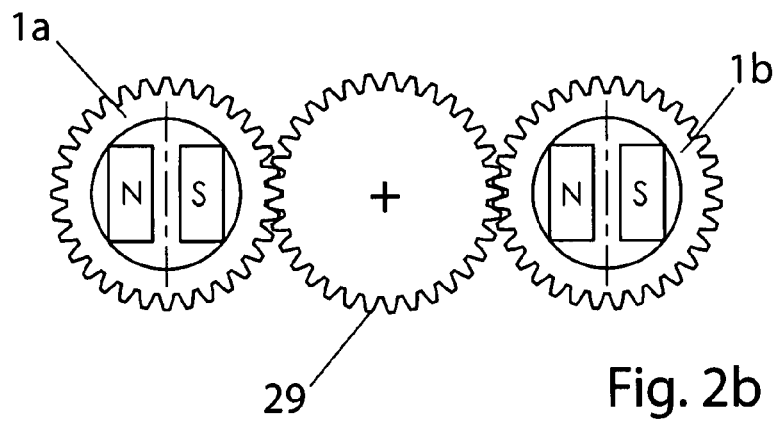

FIG. 2a differs from FIG. 1a in that a spacer gear 29 is additionally disposed between the two gears 1a, b carrying the two magnet units 5a, b in order to enlarge in particular the distance between the two angle sensor elements 12. Thus, preferably in turn, the unit detecting the rotational position within a full revolution, thus the gear 1b, is driven in rotation, however, it can also be necessary for reasons of the configuration of the housing to drive the spacer gear 29 instead as a center gear.

FIGS. 1c and d illustrate sectional views in which the course of the magnetic field lines is illustrated in addition.

The upper half of the center field line ring is the usable field 19, thus the field lines which shall extend through the measuring portion of the sensor and whose direction shall be measured by the sensor.

The lower half of the center field line ring 13 and also the two outer field line rings 14 form the magnet unit-internal scatter field, which is not used for processing through the angle sensor element 12, but which to the contrary can e.g. influence the adjacent angle sensor element of the other magnet unit in an undesirable manner and can distort its measuring result.

Furthermore, external scatter fields from other field line sources in the vicinity are not illustrated in FIG. 1c, wherein the field line sources can also influence the angle sensor element 12 in an undesirable manner.

In order to minimize this, thus, on the one hand side, to keep out external scatter fields, but in particular also to conduct the internal scatter fields, and to align the usable field to the sensor unit in the best way possible, active or passive flux conductor elements are used.

In FIG. 1a the gears 1a, b themselves are such passive flux conductor elements typically comprised of ferromagnetic material, wherein the permeability μ of the flux conductor elements should be in a suitable range, mostly between 500 and 1,000.

Since the flux conductor elements have to synchronously co-rotate with the respective magnet unit 5a, b, in order to prevent a remanence in the flux conductor element, preferably one or plural particular flux conductor elements are associated with each magnet unit 5a, b; in this case, the integral, pot shaped gear 1a, which encloses the magnet unit 5a, b in a radial annular manner, and which additionally covers it completely as a flux conductor pot 8 on the backside facing away from the angle sensor element 12.

The shaft 2 or the shaft extension 3 which pass through the base of the gear 1 are in this case also formed from the same ferromagnetic material, otherwise they may not pass through the flux conductor element.

FIG. 1c illustrates how the internal scatter field is strongly focused and minimized in its spatial, in particular radial spatial, extension through the flux conductor pot 8, and accordingly the usable field 19, which is analogously reinforced through the half of the center field line ring oriented towards the angle sensor element 12. The two outer field line rings 14 are not in the scatter field either.

Thus, in FIG. 1c, another flux conductor element is additionally disposed as flux conductor plate 7' on the sides of the angle sensor element, directly at the angle sensor element 12, which also guides and concentrates the field lines at this location, thus in the measuring portion of the angle sensor element 12, and thus improves the measurement result.

Figure 6A:
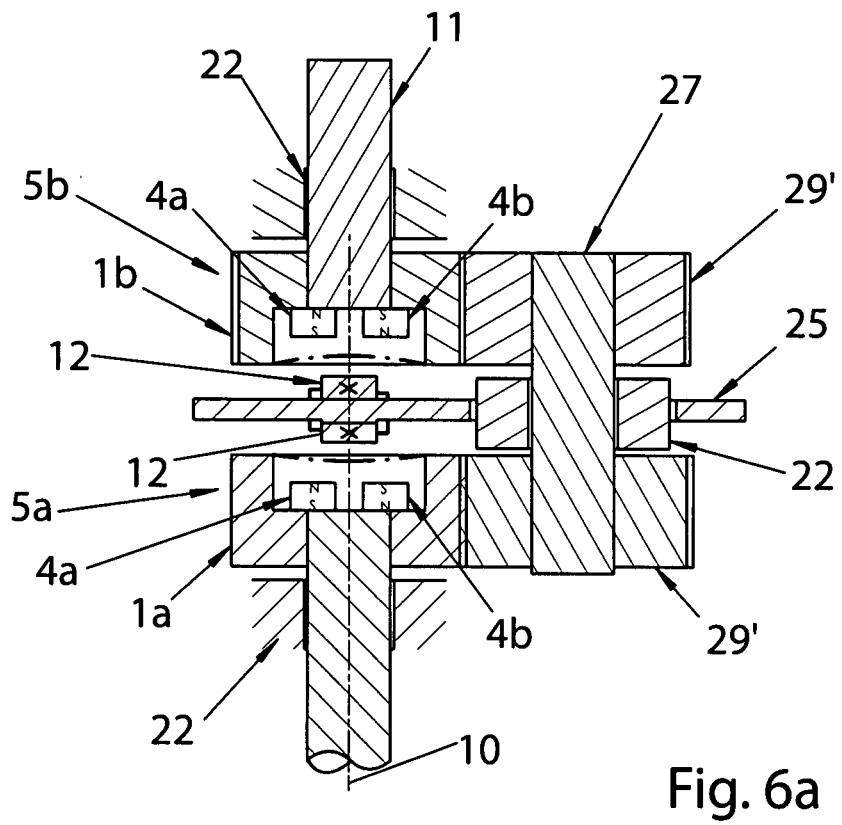
FIG. 6 illustrates an embodiment with opposed angle sensor elements.
Figure 6B:
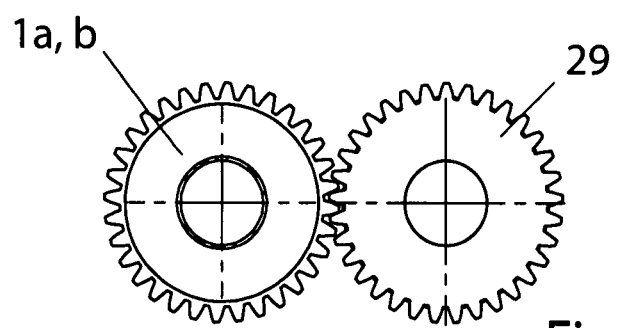
Figure 7:
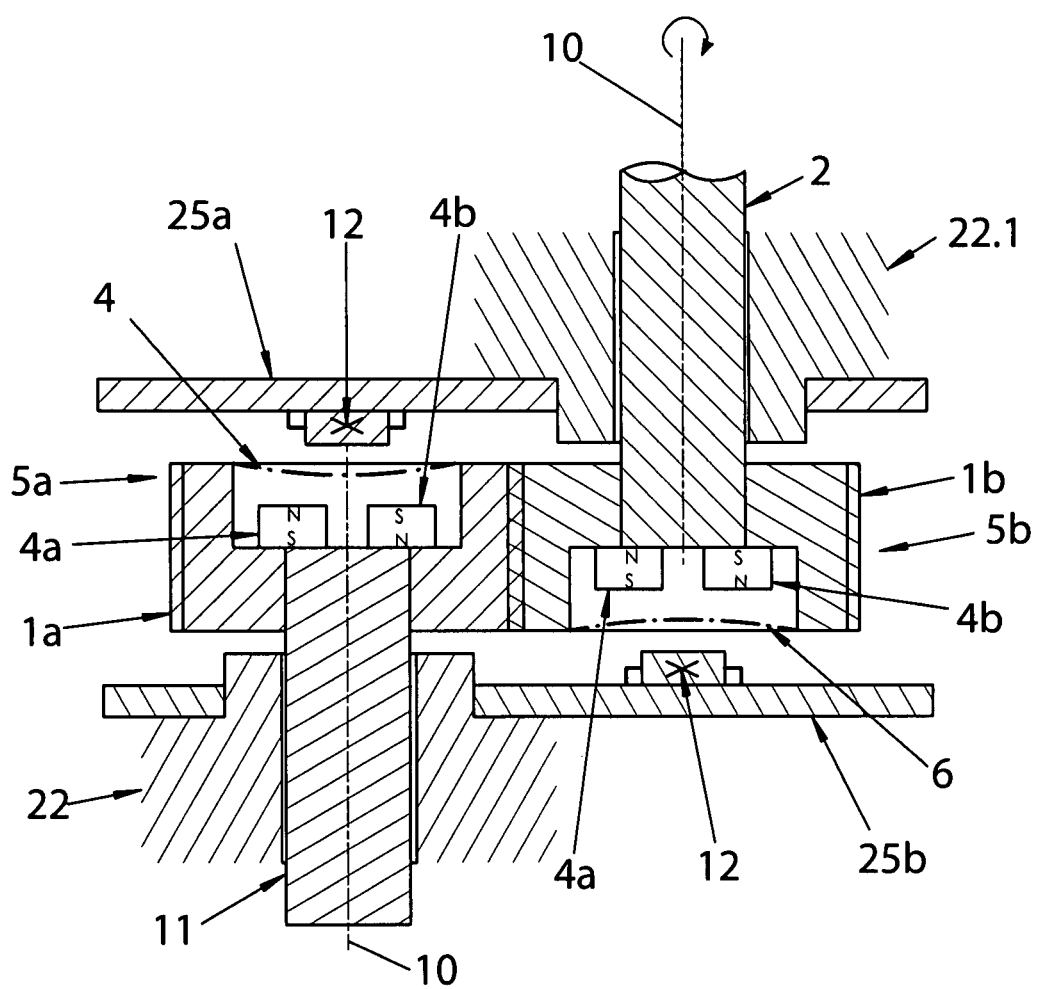
FIG. 7 illustrates an embodiment with angle sensor elements that are opposed to one another and disposed in several planes.
Figure 8A:
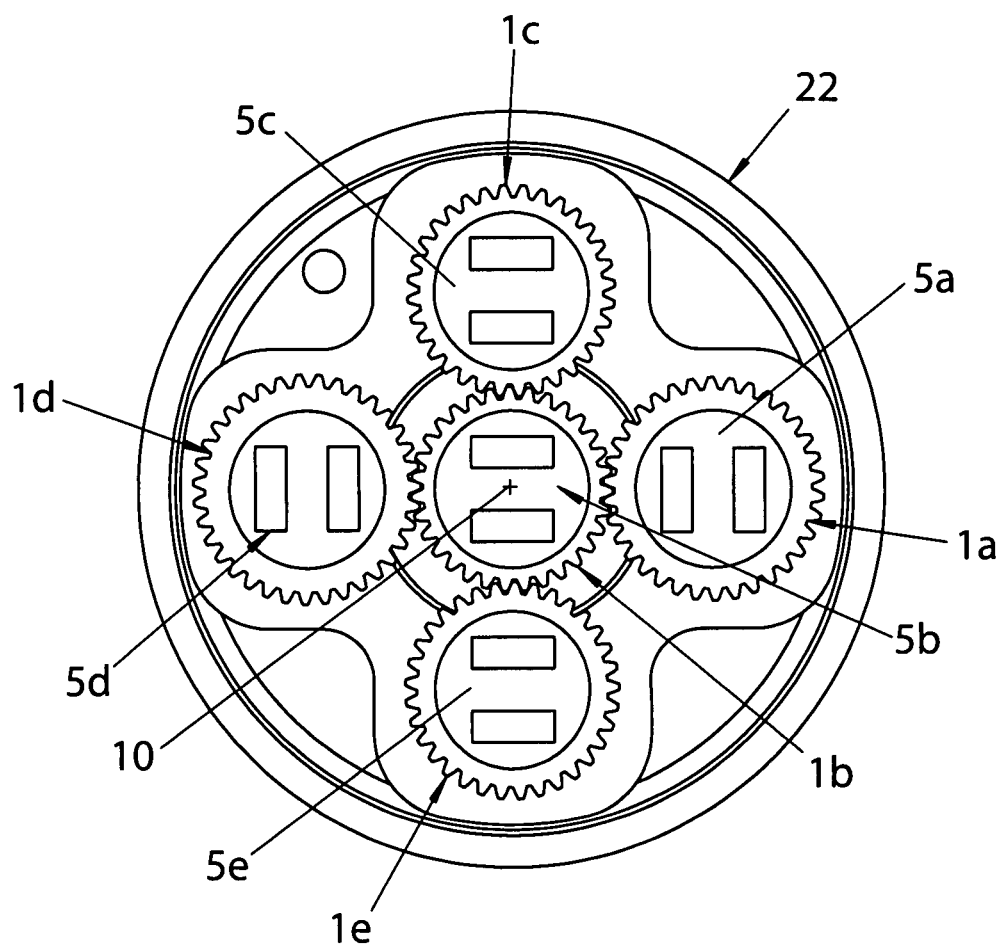
FIG. 8 illustrates an embodiment with plural transmission stages.

In FIGS. 3-7, the housing upper component 22b and also the shielding pot 21 are not illustrated anymore, and furthermore, in FIG. 8 also the angle sensor elements are not illustrated either.

Figure 1D:
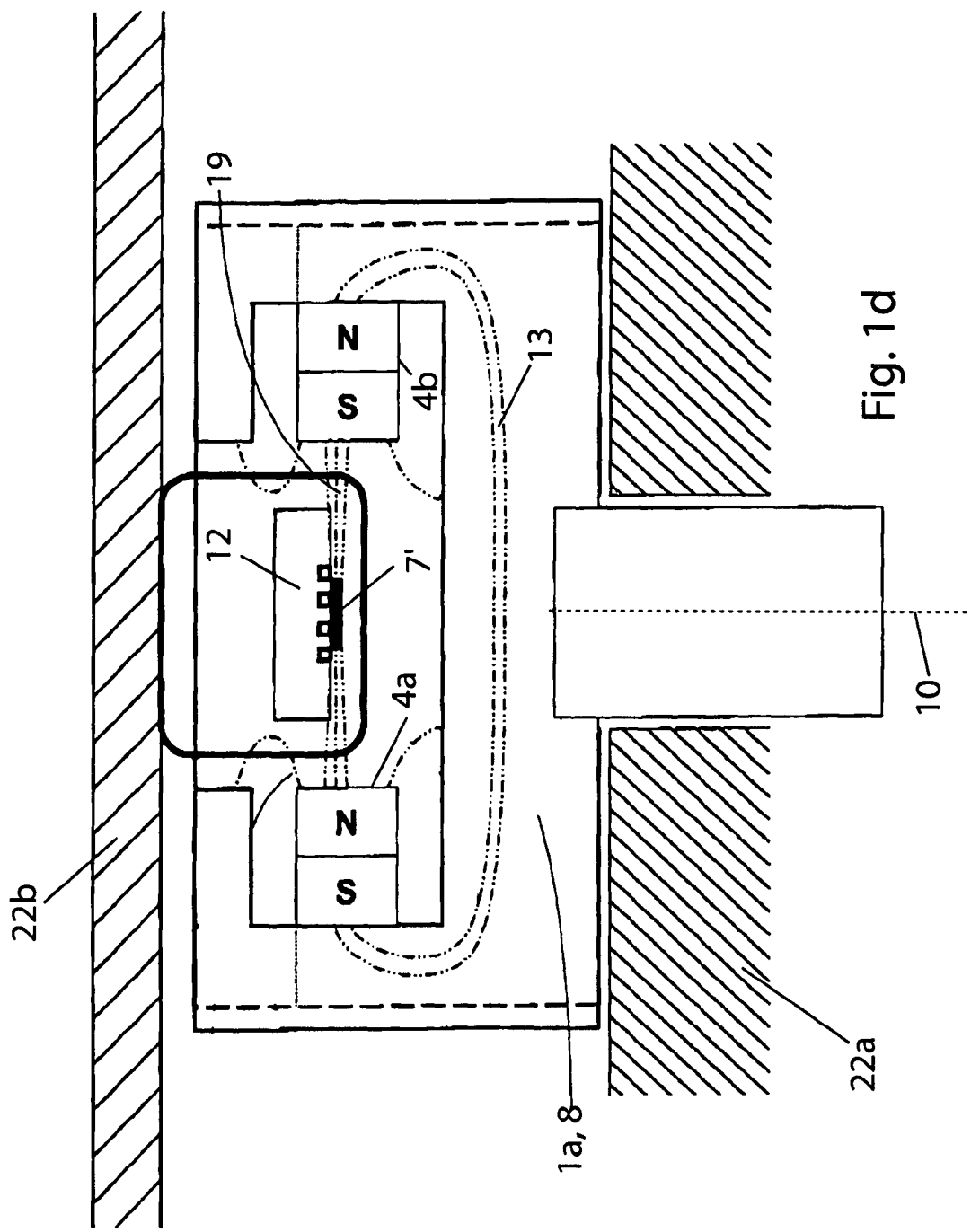
Figure 3A:
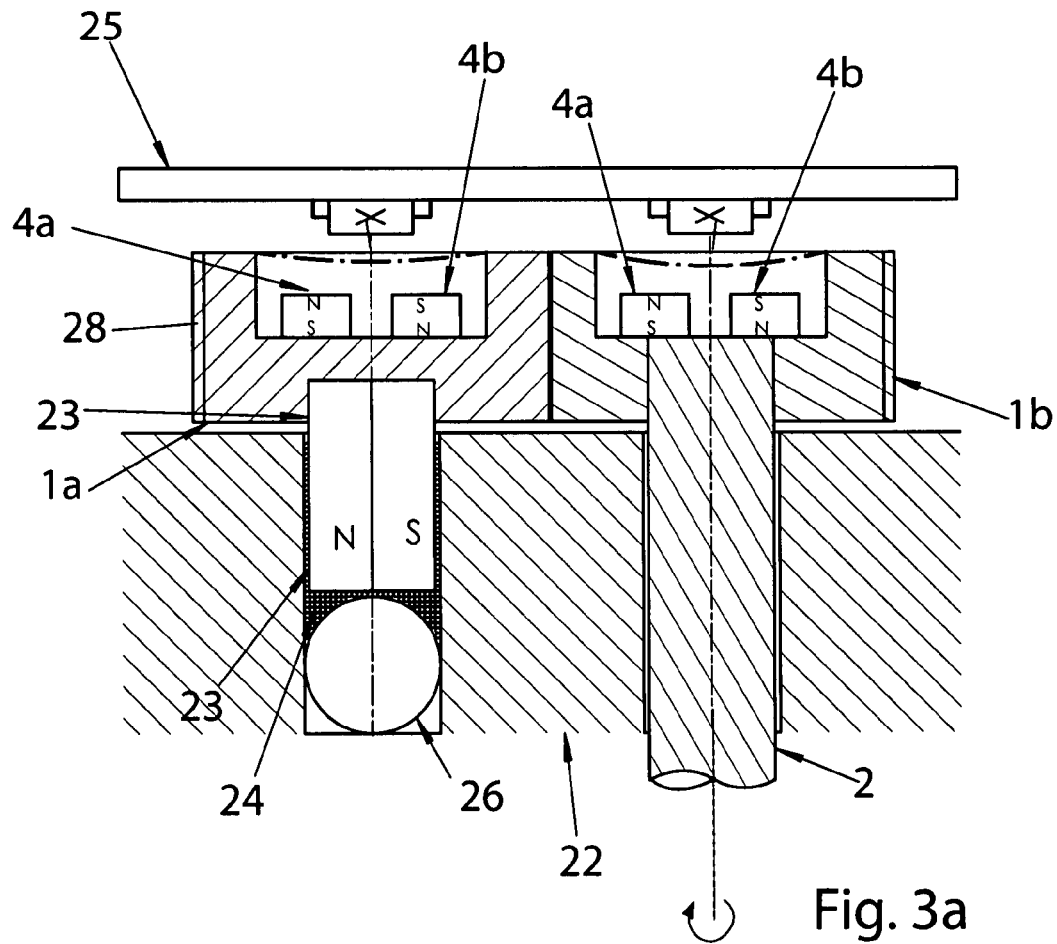
FIG. 3 illustrates a first embodiment with a Ferro-fluidic support.
Figure 3B:
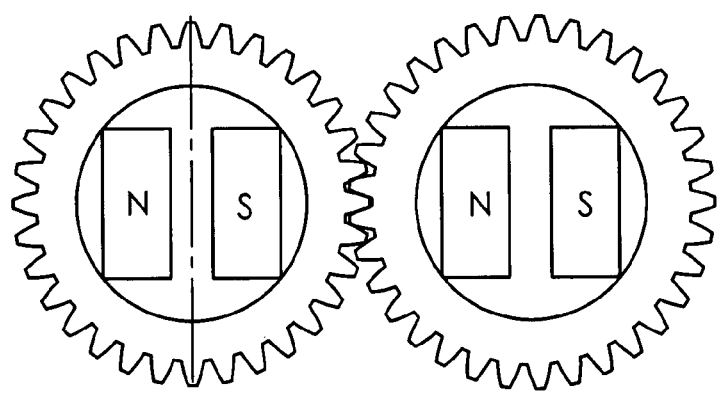
Figure 4A:
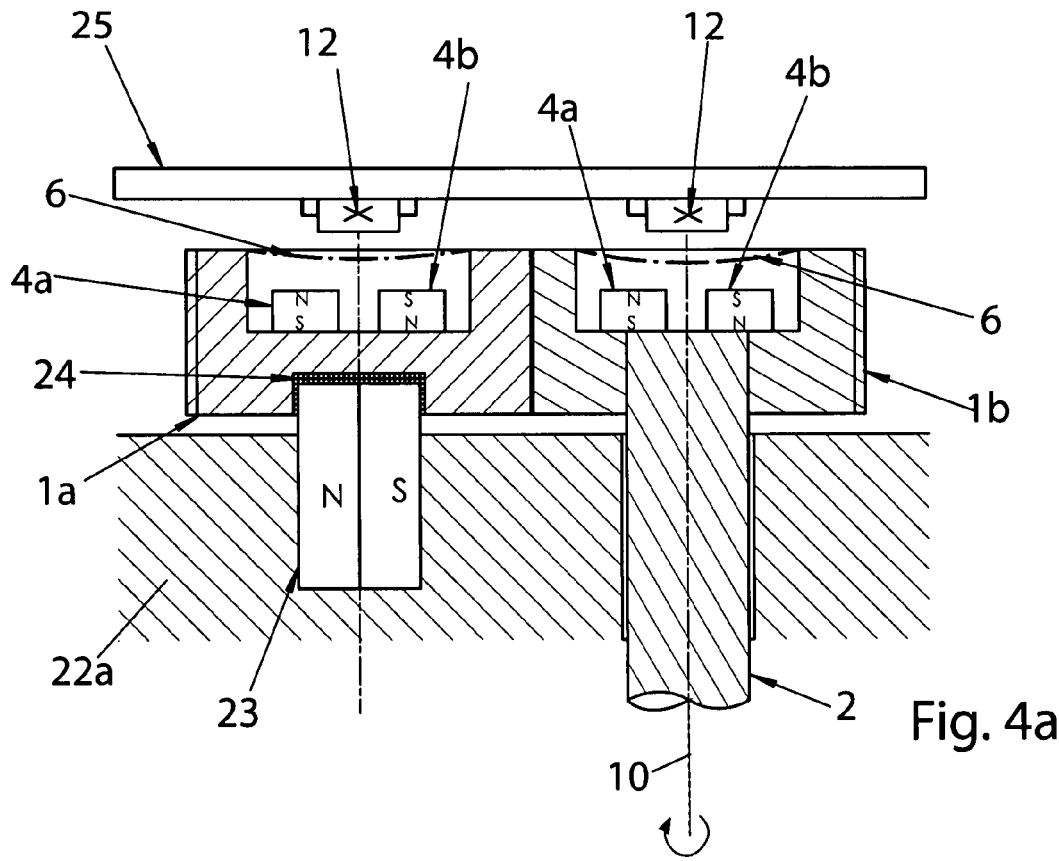
FIG. 4 illustrates a second embodiment with Ferro-fluidic support.
Figure 4B:
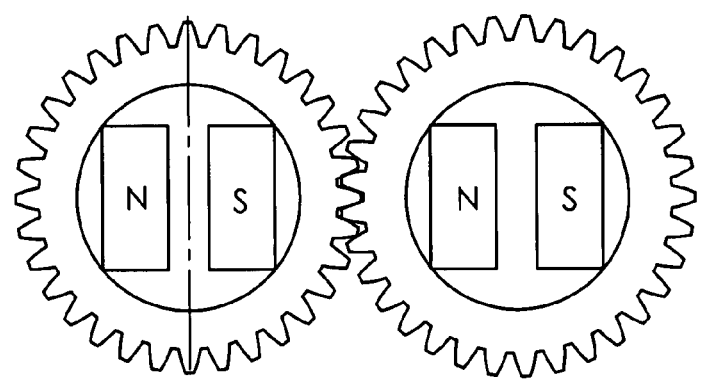

The solution in FIG. 3 differs from the solution in FIG. 1 through the type of support of the shaft extension 11 in the housing base component 22a, for which also in FIG. 4, a straight bearing with a ferrofluidic liquid 24 is selected as a lubricant.

Low friction metal particles; in particular microscopically small round metal particles, are included in a ferrofluidic liquid.

According to FIG. 3a, the shaft pinion 11 is configured as a support magnet 23, which has a pole direction transversal to its rotation axis 10', and thus contrary to FIG. 1a does not completely extend through the base of the flux conductor pot 8 configured as a gear 1a, and the shaft extension 11 does not reach the magnet unit 5b.

The field lines of this support magnet 23 have the effect that metal particles included in the ferrofluid 24 accumulate at its surface and act like small roller elements between the shaft extension 11 and the housing, wherein the accumulations will be concentrated in particular at the freely accessible outer edges of the support magnet 23.

At the base of the dead hole, in which the support magnet 23 rotates, preferably an axial support component made of metal and configured as a semi-sphere 26 is fixated, which, on the one hand side, is used as an axial support for the support magnet 23, and, on the other hand side, also retains the support magnet 23 in the bore hole, and thus prevents a liftoff of the gear 1, which is fixated to the face of the support magnet 23, from the housing component 22.

For this purpose, the retaining ball 26 is pressed e.g. into the base component 22a of the housing, wherein the housing base component 22a like the housing top component 22b can be made from plastic or aluminum.

Contrary to this, the ferrofluidic support in FIG. 4a is implemented so that the support magnet 23 is fixated in the lower housing component 22a, and protrudes there from in a direction of the magnet unit 5b, so that the gear 1 with a respective recess in its backside is rotatably supported on this protruding component of the fixated support magnet 23, in turn with a ferrofluid there between configured as a lubricant.

Figure 5A:
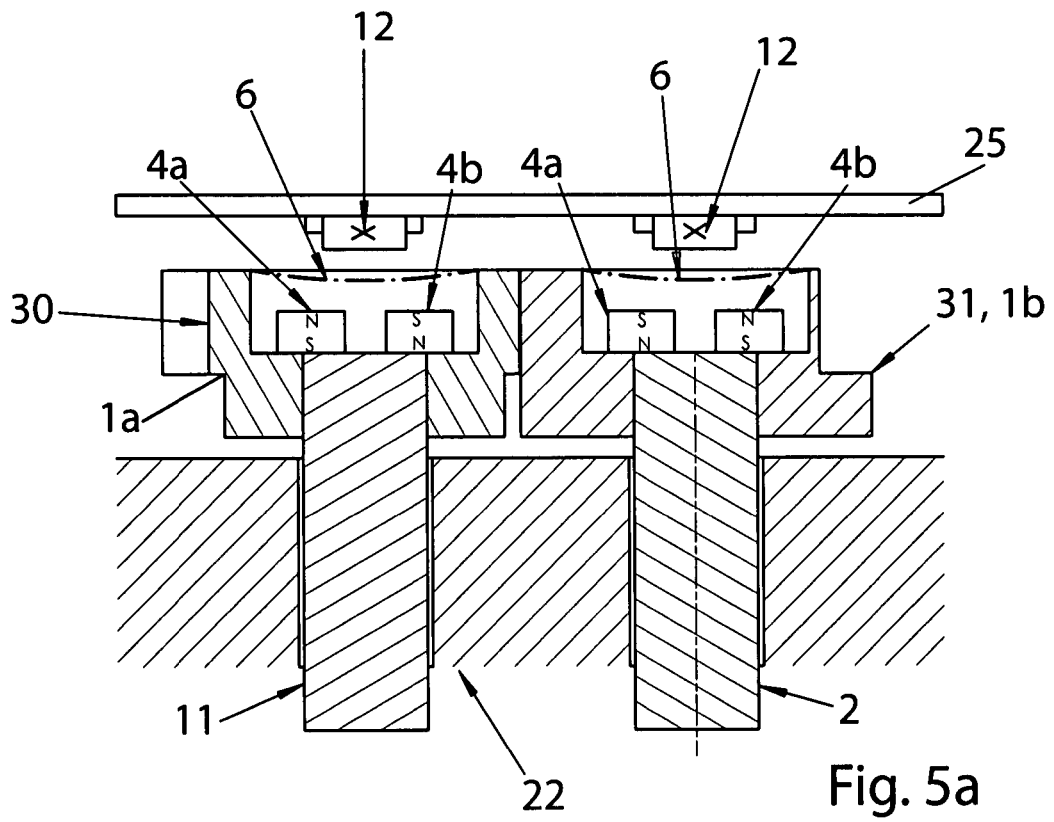
FIG. 5 illustrates an embodiment with a large transmission ratio.
Figure 5B:
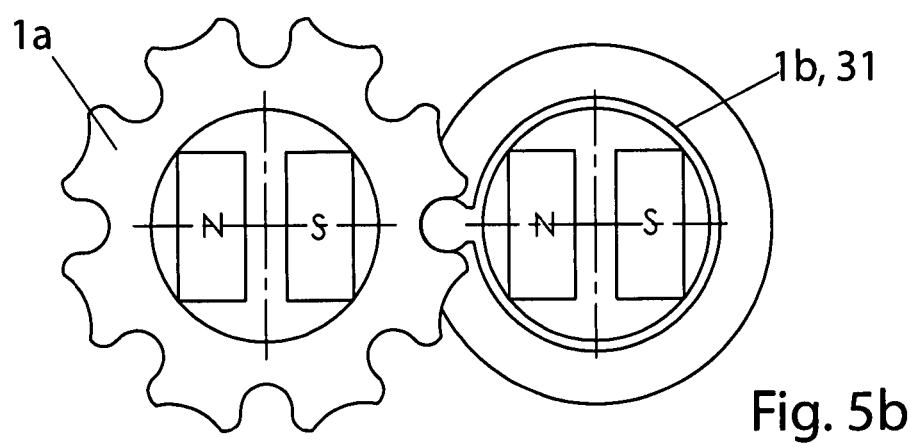

FIGS. 5-7 illustrate other solutions of the transmission configuration and partially also of the sensor assembly over FIG. 1.

In FIG. 5a, the gear 1b only includes a single tooth, thus it is configured as a one-tooth gear 31, whereas the gear 1a includes plural teeth and recesses meshing therewith.

After a full revolution of the gear 1b, thus the gear 1a is only rotated further by one of its teeth, so that a large transmission ratio is provided herein.

While angle sensor elements 12 and magnet units 5a, b are respectively disposed in FIG. 1 in a common plane, however, rotate about separate parallel offset rotation axes, FIG. 6a illustrates a solution in which all rotatable elements rotate about a common axis of rotation in that the two angle sensor elements 12 are disposed on a front- and backside of a circuit board 25 and thus without an offset from one another in the plane of the circuit board 25, and the magnet units 5a, b are axially offset there from and disposed on the same rotation axis 10 with an opposed orientation with respect to one another.

The gears 1a, b coaxially disposed in this manner but axially offset from one another are rotationally coupled with one another through a spacer gear 29' disposed adjacent thereto, wherein the numbers of teeth of the gears 1a, b of the magnet units 5a, b differ slightly, in particular only differ by a single tooth.

In this case, in turn, only one of the two shafts or its gear is driven from the outside, thus the lower gear 1a directly.

FIG. 7 illustrates a configuration in which the magnet units 5a, b rotate about rotation axes 10, 10' offset from one another in parallel direction, however, faces are disposed on the gears 1a, b, wherein the faces are oriented in different directions, and the gears 1a, b rotate in a common plane. Accordingly, then the angle sensor elements 12 are disposed on two circuit boards 25a, b which are offset with respect to their planes and which are separate circuit boards in particular.

Thus, FIG. 8 illustrates a solution in top view, thus in a view analogous to FIG. 1b, in which a gear 1b with a magnet unit 5b is disposed in a center of a round, in particular rotation symmetrical housing 22, and represents the gear driven from the outside.

Four gears 1a, c, d, e are disposed about the center, wherein the gears respectively only mesh with the center gear 1b and respectively also support a magnet unit 5a, c, d, e, and are respectively detected by a separate associated angle sensor element with respect to the rotation position of the magnet field.

A processing unit processes the signals of all five angle sensor elements. Since the associated gears respectively include slightly different numbers of teeth compared to one another and compared to the central gears, wherein the numbers preferably only differ by one tooth, this creates five periodically repeating signal curves whose signal lengths are different respectively, so that only after a very large number of revolutions of the center gear 1b, the exact condition of the transmission, thus the rotational position of all magnet units respectively in the same position as at the beginning occurs. This facilitates detecting very high numbers of total rotations.

Figure 8B:
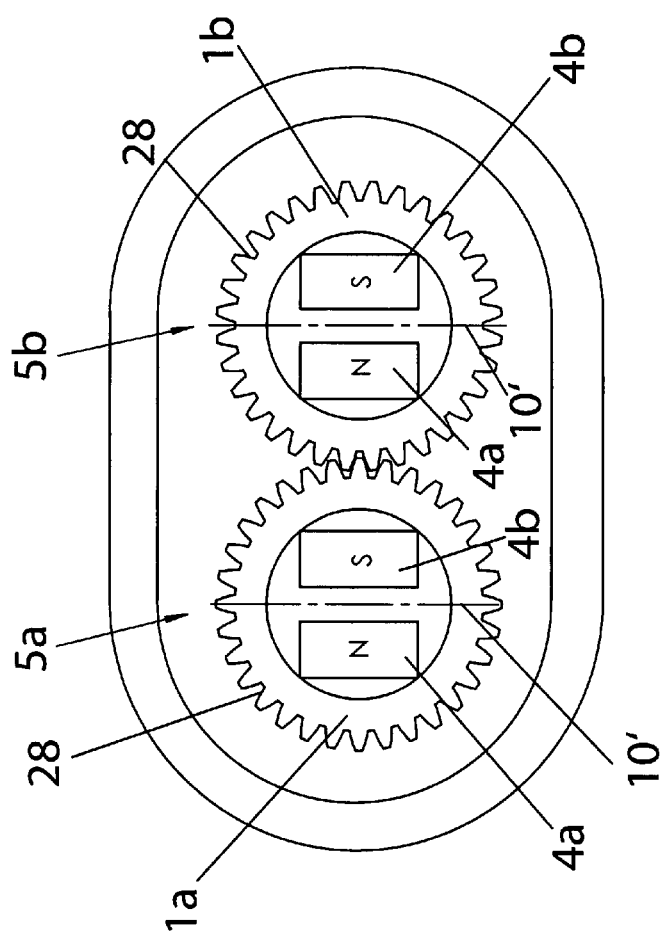

Contrary thereto, FIG. 8b illustrates a housing 22 configured as a slotted hole, thus with two semicircular ends, which tightly encloses only two gears 1a, b according to FIG. 1, thus the housing is in particular not rotation symmetrical with respect to the driven shaft of a gear.

Figure 9A:
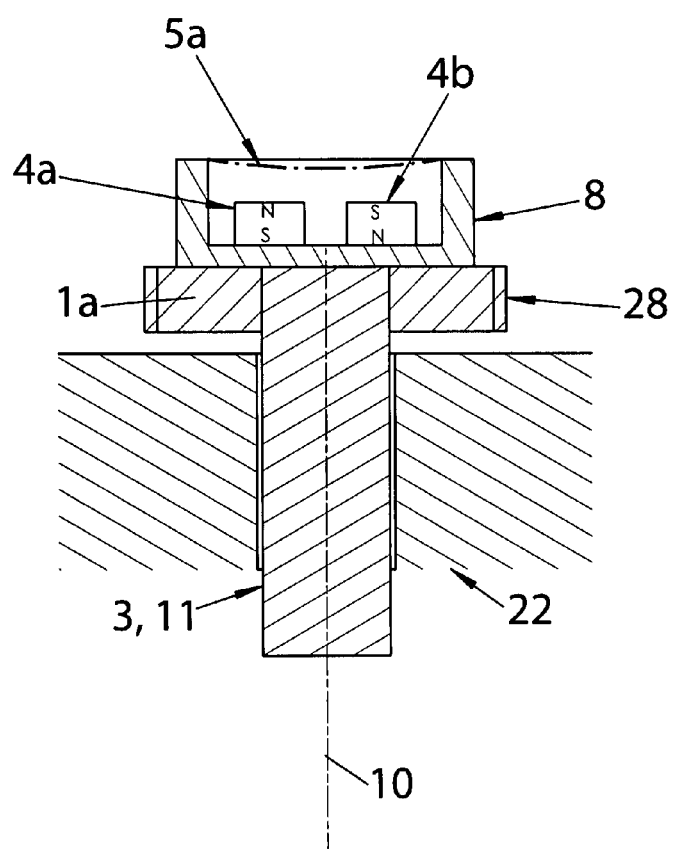
FIG. 9 illustrates various embodiments of the particular magnet units.

FIG. 9a illustrate particular gears 1a ... with magnet units 5a ... for a respectively identical configuration of the magnet unit e.g. 5a, like the magnet unit in FIG. 1, including two particular magnets 4a, b, however, with a different surrounding configuration.

Thus, the flux conductor element according to FIG. 9 is configured as a flux conductor pot 8, which contrary to FIG. 1, however, has no teething directly on its outside, but the teething is provided on a separate gear 1a as usual as a circumferential teething, which is connected torque proof with the drive shaft 2 or the shaft extension 11, and does not have to be made from ferromagnetic material. On the front face of the gear 1*a*, the flux conductor pot 8 is centrally disposed with its recess pointing away from the gear 1*a*, wherein the magnet assembly 5*a* is disposed in the recess.

Figure 9B:
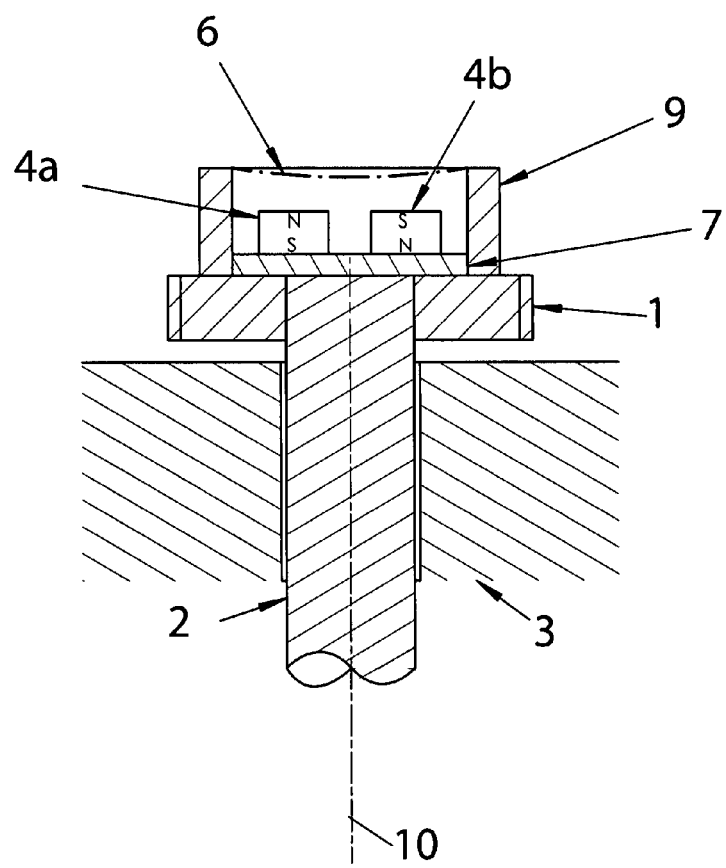

While the flux conductor pot 8 is integrally configured in FIG. 9*a*, it is composed according to FIG. 9*b* from a radially circumferential flux conductor ring 9, and a separate flux conductor plate 7 forming the base of the pot, which are tightly adjacent to one another.

Figure 9C:
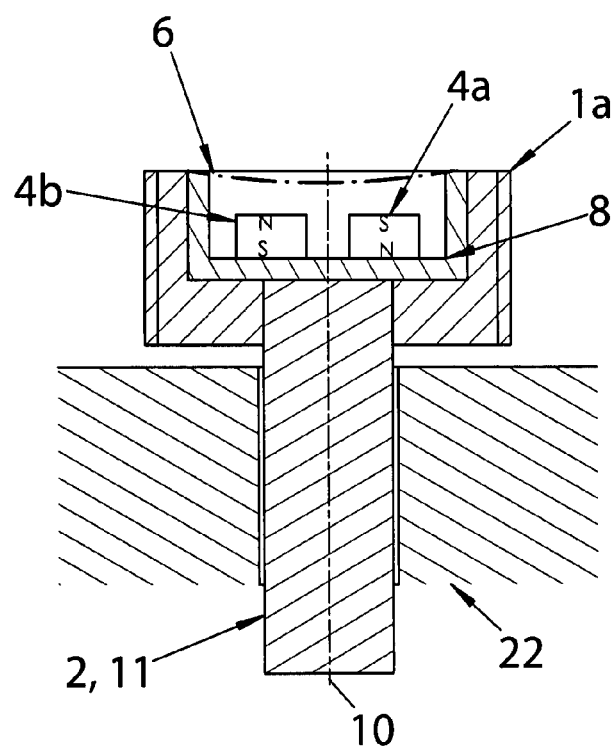

In FIG. 9*c*, the flux conductor pot 8 in turn is integrally configured, however, inserted into a fitting face side recess of the gear 1*a*, instead of being placed on the flat face of the gear 1*a*.

Figure 9D:
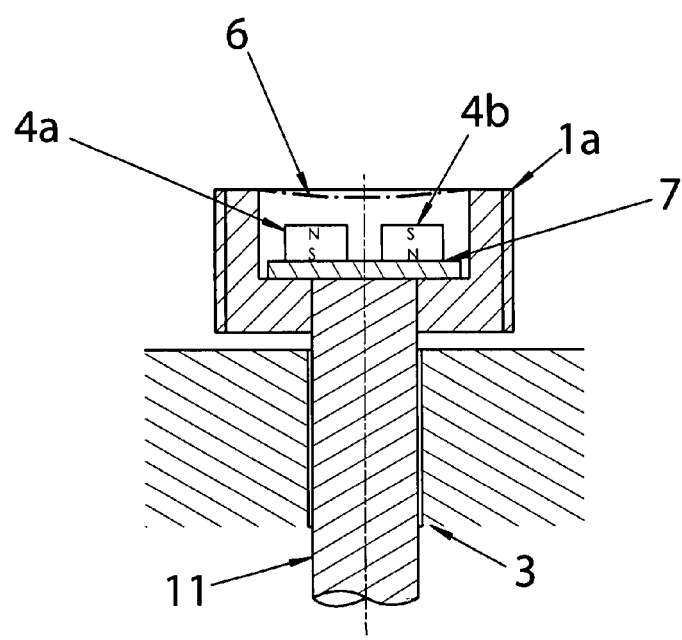

FIG. 9*d* illustrates a variant, which is reduced compared to the variant recited supra, in which only one flux conductor plate 7 is disposed axially between the magnets 4*a, b* and the base of the recess in the gear 1*a*. However, the magnets 4*a, b* are not surrounded by a flux conductor element on their radial outsides.

Figure 10A:
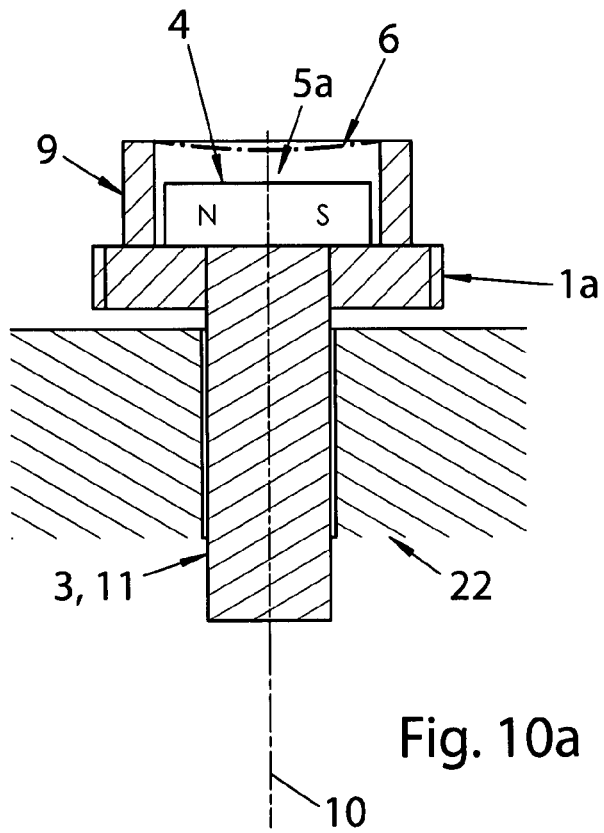
FIG. 10 illustrates an embodiment with only one magnet in the magnet unit.
Figure 10B:
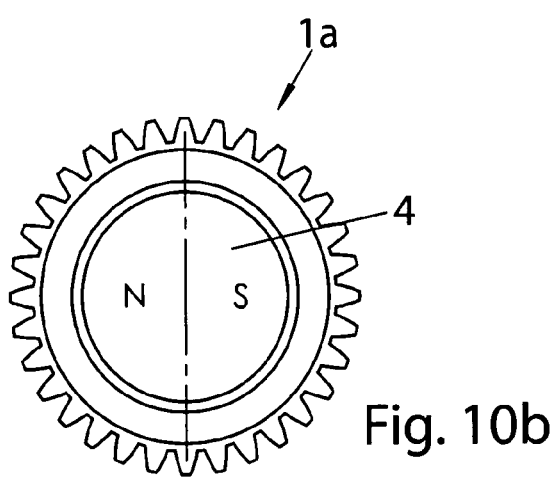

FIGS. 10*a* and 10*b* illustrate a solution, in which the magnet unit 5*a* in principle is disposed analogously to FIG. 9*a* or FIG. 9*b* on the openly accessible face of the gear, e.g. 1*a*, the magnet assembly, e.g. 5*a*, is only comprised of a single magnet 4, whose pole direction is oriented transversally, thus perpendicular to the rotation axis 10 of the magnet unit 5*a*, and the magnet 4 furthermore includes a circular outer contour in top view.

As a flux conductor element, only a flux conductor ring 9 is provided, which radially envelopes the round magnet 4, wherein the flux conductor ring 9 sits on the accessible face of the gear 1*a* like the magnet 4.

A position of this type for the pole axis of the magnet unit 5*a* typically yields a weaker usable field than the assembly with two magnets according to FIG. 1.

Figure 10C:
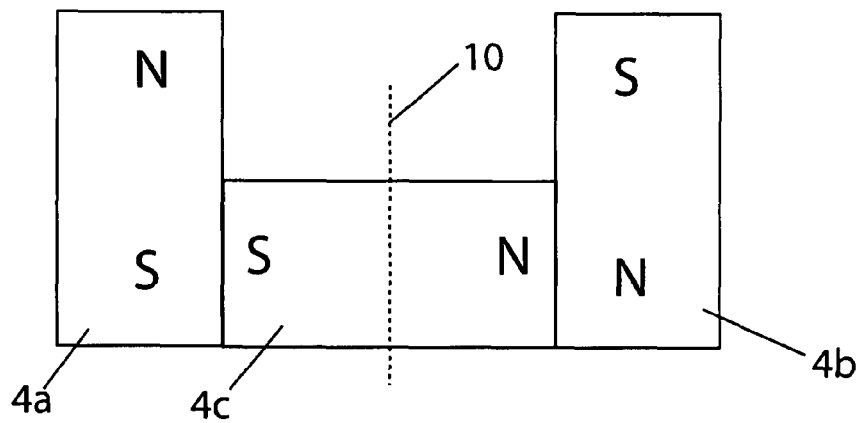
Figure 10D:
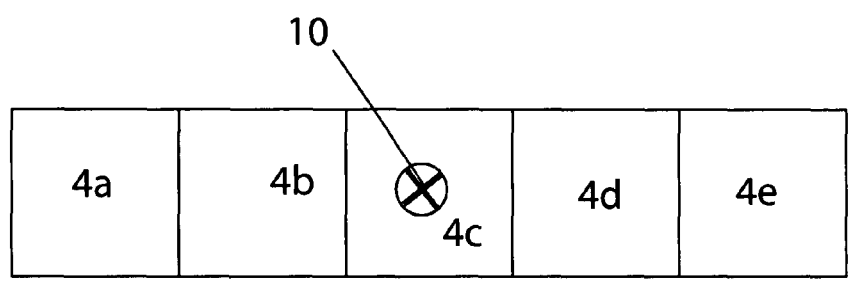
Figure 10E:
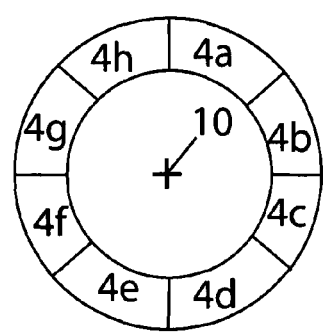

The FIGS. 10*c-e* illustrate additional magnet assemblies within the magnet unit 5*a*.

Thus, for the solution according to FIG. 10*c*, a third magnet 4*c* is provided in addition to the two magnets 4*a, b* per magnet unit in FIG. 1 in the clearance between the two magnets, wherein the pole axis of the third magnet is disposed transversal to the rotation axis 10, and the third magnet contacts in particular the two magnets 4*a, b* with its field line exit surfaces. Thus, identical poles of the'magnets 4*a* and 4*c*, and 4*c* and 4*b* are disposed adjacent to one another.

This and also the FIGS. 10*d* and 10*e* are magnet assemblies, which are intended to minimize the non-usable scatter field and amplify the usable field, so that the magnet assembly itself acts as an active flux conductor element.

A know magnet arrangement in this context is the so-called Halbach-arrangement according to FIG. 10*e*, which relates to a circular ring or polygonal ring assembled from discreet magnets 4*a* . . . with different pole directions, wherein the polygonal ring is disposed coaxial to the rotation axis 10. This specific known pole orientation arrangement helps to provide a very good usable field; however, the complexity of the manufacture for the magnet ring is substantial due to the prevailing forces pushing the discreet magnets 4*a* . . . apart.

FIG. 10*d* illustrates a simpler configuration of a rod shaped magnet, which in turn is assembled from discreet magnets 4*a* . . . with different defined pole axis orientations, which are then disposed with their longitudinal extensions transversal and symmetrical to the rotation axis 10.

Figure 11:
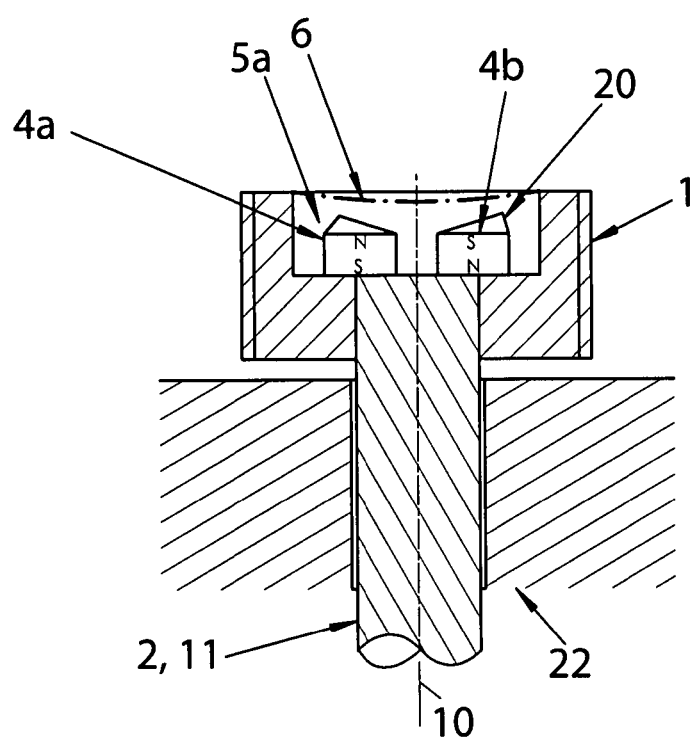
FIG. 11 illustrates a specific embodiment of the magnets in the magnet unit.

Furthermore, FIG. 11 separately illustrates a configuration of the flux exit surfaces 20 oriented towards the angle sensor element, wherein the surfaces are illustrated as a flux exit surface 20, declining at a slant angle towards the center of the magnet unit 5*a*, thus the rotation axis 10 or 10', which causes the exiting field lines to be oriented more towards the center of the angle sensor element, and thus some field lines which according to FIG. 1*c* would run past the angle sensor element 12, pass through the angle sensor element 12 still in the measuring portion.

It shall be furthermore clarified to which ranges of dimensions of the angle sensor this relates.

The entire angle sensor including the housing 22*a, b* shall have a diameter of 36 mm at the most and an axial extension of 50 mm at the most, even better in both dimensions less than 20 mm which means that e.g. the diameter of the gears 1*a, b* is in a range of 5 mm and their axial extension may even be below 5 mm.

Accordingly, the distance of the rotation axis is only slightly more than 5 mm, and thus the clearance between the two angle sensor elements 12 is even smaller, so that it becomes clear how easily an alternative influencing of an angle sensor element 12 through the other non-associated magnet units becomes possible without measures for flux conduction.

Reference Numerals and Designations

1*a, b* gear
2 drive shaft
3 bearing
4, 4*a, b* magnet
5*a, b* magnet unit
6 encasement/glued connection
7, 7' flux conductor plate
8 flux conductor pot
9 flux conductor ring
10, 10' rotation axis
11 shaft extension
12 angle sensor element
13 center field line ring
14 outer field line ring
15
16
17
18
19 usable flux/usable field
20 flux exit surfaces
21 shielding pot
22 housing
22*a* lower housing component
22*b* upper housing component
23 support magnet
24 ferrofluid
25 circuit board
26 retaining ball
27 intermediary shaft
28 outer teething
29, 29' spacer gear
30 processing electronics
31 single tooth gear

The invention claimed is:
1. An arrangement for magnets (4) to be used as position encoders for detecting more than one revolution, comprising:
at least two rotatably supported magnet units (5) operatively connected by teething, wherein one of the magnet units is driven in rotation and the magnet units rotate at different speeds of rotation but at a fixed speed ratio relative to one another and wherein outer teethings (28)

of the magnet units differ with respect to the numbers of their teeth only by one tooth, and thus a differential transmission is formed;

an angle sensor element (12) is associated with each of said at least two magnet units (5), which detects the magnetic field of the magnet unit (5), wherein at least one magnet unit (5) includes a co-rotating flux conductor element;

each magnet unit (5) supports at least one magnet (4), wherein the teeth circumferentially surround the magnet units, respectively;

the flux conductor element covers the magnet unit on the backside facing away from the angle sensor elements as a base;

the arrangement includes processing electronics (30) configured to detect the number of complete revolutions based on the signals of two or more of the angle sensor elements (12) of the magnet unit (5), and the processing electronics (30) are disposed in a housing (22) of the sensor, and on one of the angle sensor elements (12) configured as a chip.

2. The arrangement according to claim 1, wherein:

the at least one magnet (4) is preferably disposed eccentrically to the respective rotation axis (10) of the magnet unit (5), or the angle sensor elements (12) have the same resolution and the same measuring precision and are in particular configured in the same manner or identical.

3. The arrangement according to claim 1, wherein the magnetic field sensitive angle sensor element (12) is an element measuring the magnet vector, in particular an XMR-element or a Hall-array, in particular made from four or more particular HALL-elements or a vertical Hall-element.

4. The arrangement according to claim 1, wherein:

the flux conductor element and the teething are integrally configured and the magnet unit (5) is disposed in the, interior of the pot shaped flux conductor element, or the flux conductor element is a plastic based component in which magnetic particles are encased, or the flux conductor element and the teething (28) are separate components, and the flux conductor element is made from ferromagnetic steel and the teething (28) is made from plastic material.

5. The arrangement according to claim 1, wherein:

when the teething is configured integral with the flux conductor element, the flux conductor element is made from a material with a suitable remanence μ of 50 to 1,000.

6. The arrangement according to claim 1, wherein:

the flux conductor element envelopes the magnet unit (5) radially, at a distance as a rim, and envelopes it in art annular manner as a circular or polygonal flux conductor ring (9), or the flux conductor element is configured as a flux conductor pot (8).

7. The arrangement according to claim 1, wherein the flux conductor element in a particular composition, arrangement or configuration of the at least one magnet (4) of the magnet unit (5) is made from discrete elements in such a manner that its radially outer scatter fields, are minimized, but its usable fields supplement and amplify one another.

8. The arrangement according to claim 1, wherein the angle sensor includes a flux concentrator which guides the field lines to the angle sensor element in a controlled manner and each magnet unit supports two magnets, and the flux concentrator is configured as a respective configuration of the surfaces of the at least one magnets (4) of the magnet unit (5) oriented towards the angle sensor element, and the two magnets (4) disposed eccentric and with their pole axes parallel to the rotation axis (10) include a flux exit surface (20), which is inclined towards the rotation axis (10) on the side facing towards the angle sensor element (12).

9. The arrangement according to claim 2, wherein each magnet unit supports two magnets, disposed eccentrically to the respective rotation axis of the magnet unit and wherein:

the magnet unit (5a, b) in addition to the two eccentric magnets (4) with a pole direction in the direction of the rotation axis (10) includes a magnet (4c) there between with a pole orientation transversal to the rotation axis (10), which is oriented from one of the first two magnets (4) to the other of the first two magnets or the magnet arrangement of the magnet unit (5) is an annular rod shaped 8 Hallbach-arrangement.

10. The arrangement according to claim 2, which is received in a 2 housing, wherein viewed in the direction of the rotation axis (10)

the housing (22) is disposed rotation symmetrical with respect to an input shaft, or the housing has a circular segment shaped, triangular or slotted hole shaped outer contour and the input shaft protrudes into an end portion of the housing (22).

11. The arrangement according to claim 10, wherein:

the angle sensor comprises at least four magnet units (5), which respectively have different speed ratios, with reference to the directly driven magnet unit (5), and all magnet units are disposed in a common plane, and in the rotation symmetrical housing (22), and about a central driven magnet unit (5), at least four magnet units are arranged with an even distribution, each respectively comprising an external teething (28), and differing with respect to their numbers of teeth from the numbers of teeth of the respective other magnet units (5) as little as possible.

12. The arrangement according to claim 1, wherein there are two of the rotating magnet units and an intermediary spacer element, a center gear, is disposed between said two rotating magnet units (5), wherein the intermediary element is the driven gear (1c), and said two magnet units (5) are disposed opposite to one another with respect to the center gear.

13. The arrangement according to claim 1, wherein there are two of the rotating magnet units and two respective sensor elements, and wherein:

the two angle sensor elements (12) are disposed without an offset in the plane of the circuit board (25) and opposite to one another, and the two magnet units (5) rotate about a common rotation axis (10), or the two magnet units rotate about rotation axes (10) disposed in parallel to one another and the magnet units (5) are disposed on faces of gears (1) oriented in opposite directions, or the angle sensor elements (12) are disposed on both sides of the same circuit board (25) oriented away from one another and the magnet units (5) are disposed opposite to one another with respect to the circuit board (25) with the magnet units oriented against one another.

14. The arrangement according to claim 1, wherein at least the non-driven magnet unit (5) is supported in a straight bearing in a housing (22) through a ferrofluid in that either a shaft extension (11) of the magnet unit (5) supported in a ferrofluid is a magnet (4) with a pole orientation, transversal to the rotation axis (10), wherein shaft extension which is a magnet is in direct contact with the the at least one magnet of the non-driven magnet unit, and the magnetic shaft extension (11) with its rear housing side end contacts a retaining ball (26) which is pressed into the support bore hole of the housing (22), made from plastic material, or the magnet unit (5) is supported rotatable in a ferrofluid with respect to an axle extension which is disposed torque proof in a housing (22) and configured as a magnet (4).

15. The arrangement according to claim 1, wherein each magnet unit supports two magnets and wherein:

the two magnets (4) of each magnet unit (5) are disposed eccentric and symmetrical to the angle sensor element (12) with parallel opposite pole orientations, which are disposed parallel to the rotation axis (10) of the magnet unit (5) and the angle sensor element (12) is disposed axially offset from the magnets (4), or the magnets (4) are disposed eccentric and symmetrical to the angle sensor element (12), wherein the magnets have an identical pole orientation which is oriented transversal to the rotation axis (10) of the magnet unit (5), and the angle sensor element (12) is disposed between the magnets (4).

16. An arrangement for magnets (4) to be used as position encoders for detecting more than one revolution, comprising at least two rotatably supported magnet units (5) operatively connected by respective operative connections with respect to their rotatabilities, wherein one of the magnet units is driven in rotation and the magnet units rotate at different speeds of rotation but at a fixed speed ratio relative to one another;

an angle sensor element (12) is associated with each of said at least two magnet units (5), which detects the magnetic field of the magnet unit (5), wherein at least one magnet unit (5) includes a co-rotating flux conductor element;

each magnet unit (5) supports at least two magnet (4), wherein the operative connections circumferentially surround the magnet units, respectively;

the flux conductor element covers the magnet unit on the backside facing away from the angle sensor elements as a base: and wherein the angle sensor includes a flux concentrator which guides the field lines to the angle sensor element in a controlled manner, and the flux concentrator is configured as a respective configuration of the surfaces of the magnets (4) of the magnet unit (5) oriented towards the angle sensor element, and the two magnets (4) disposed eccentric and with their pole axes parallel to the rotation axis (10) include a flux exit surface (20), which is inclined towards the rotation axis (10) on the side facing towards the angle sensor element (12).

\* \* \* \* \*